US006186029B1

(12) United States Patent  (10) Patent No.: US 6,186,029 B1
McQuinn  (45) Date of Patent: *Feb. 13, 2001

(54) DUAL INPUT TRANSMISSION

(75) Inventor: Ted McQuinn, Cornelius, NC (US)

(73) Assignee: Dana Corporation, Toledo, OH (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/890,518

(22) Filed: Jul. 9, 1997

(51) Int. Cl.$^7$ .................................................. F16H 3/093
(52) U.S. Cl. .............................................. 74/718; 74/331
(58) Field of Search ........................ 74/331, 360, 665 B, 74/718, 730.1

(56) References Cited

U.S. PATENT DOCUMENTS

| 1,453,032 | * | 4/1923 | von Sodern-Fraunhofen | ........ 74/331 |
| 2,612,787 | * | 10/1952 | Youngun et al. | ................. 74/331 X |
| 2,772,581 | | 12/1956 | Maier et al. . | |
| 2,804,780 | | 9/1957 | Gerst | ...................... 74/360 |
| 2,943,501 | | 7/1960 | Stapleton | ................. 74/335 |
| 2,949,793 | | 8/1960 | Suri . | |
| 3,102,432 | | 9/1963 | Gerst | ...................... 74/360 |
| 3,126,752 | | 3/1964 | Bolster | .................. 74/359 |
| 3,130,595 | | 4/1964 | Cook | ...................... 74/331 |
| 3,389,614 | | 6/1968 | Shiber et al. | ........... 74/330 |
| 3,425,293 | | 2/1969 | Krawczyk et al. | ...................... 74/360 |
| 3,465,609 | | 9/1969 | Fisher et al. | ........... 74/360 |
| 3,578,760 | | 5/1971 | Shinmura . | |
| 3,675,508 | | 7/1972 | Blank . | |
| 3,915,031 | | 10/1975 | Hanson . | |
| 4,056,986 | | 11/1977 | Hobbs . | |
| 4,159,654 | * | 7/1979 | Hattori | ................ 74/331 |
| 4,375,171 | * | 3/1983 | Morscheck | .................. 74/331 |
| 4,495,838 | * | 1/1985 | Gooch | ................ 74/331 X |
| 4,513,631 | | 4/1985 | Koivunen | ................ 74/360 |
| 4,548,101 | * | 10/1985 | Okashi et al. | ................ 74/718 X |
| 4,635,495 | * | 1/1987 | White | .................. 74/360 X |
| 4,813,306 | | 3/1989 | Kita et al. . | |
| 4,843,907 | | 7/1989 | Hagin et al. . | |
| 4,864,881 | | 9/1989 | Beeson et al. | ................ 74/360 |
| 4,916,960 | * | 4/1990 | Inui et al. | .................. 74/331 |
| 5,471,892 | * | 12/1995 | Sherman | ................ 74/331 X |

FOREIGN PATENT DOCUMENTS 96910   9/1963  (DK) .
2110324  6/1983  (GB) .
1272040  11/1986  (SU) .

* cited by examiner

Primary Examiner—Sherry Estremsky
(74) Attorney, Agent, or Firm—Watts, Hoffmann, Fisher & Heinke Co.

(57) ABSTRACT

A multi-speed transmission assembly including a gear box portion having first and second inputs and an output; the first input is connectable to a pump portion of the torque converter, whereas the second output is selectively connectable to an impeller portion of said torque converter such that separate torque converter and direct drive paths are established from a prime mover to the transmission output. Clutches are used to selectively couple the first and second inputs with their associated driving elements. The gear box includes two countershafts having their axes arranged to be parallel and spaced apart from each other and parallel and spaced from an axis of an output shaft. The axes are arranged in a triangular relationship which enables a "straight through" version, a "short drop" version and a "long drop" version of the transmission to be easily manufactured using a commonality of components. By providing different input gear ratios for the first and second inputs, the torque converter can be used as an "energy absorber" under certain vehicle operating conditions, by simultaneously actuating clutches associated with the first and second inputs to produce relative rotational speeds in the impeller and pump portions of the torque converter.

12 Claims, 2 Drawing Sheets

DUAL INPUT TRANSMISSION

TECHNICAL FIELD

The present invention relates generally to transmissions and, in particular, to a transmission having dual drive paths and having components arranged such that a "straight-through", "short drop" and "long drop" version of the transmission can be provided using a large number of common components.

BACKGROUND ART

A type of transmission known as a "power shift" transmission is used in many on-road and off-road applications. In this type of transmission, a torque converter is usually disposed between the vehicle engine and the gear box. The gear box, which typically has automatic shift capability, differs from conventional automobile transmissions in that it uses multiple shafts that mount gear/clutch assemblies, as opposed to planetary units used in conventional automobile automatic transmissions. The gear clutches are selectively engaged to couple the gearbox input with the gearbox output in a ratio determined by the selected gears. This arrangement provides the multiple speed capability for the transmission.

This type of transmission typically includes a forward/reverse shaft which mounts forward and reverse clutch/gear assemblies. This type of transmission also includes at least one countershaft which mounts gears for providing other speeds and utilizes clutches for coupling the gears to the shaft. The forward and reverse clutches determine whether the transmission is in forward, reverse or in neutral (neither clutch engaged), whereas the selective application of the other clutches determine the "range" of the transmission. In transmissions that employ a torque converter, it is known to provide a "lock-up" clutch to mechanically lock the turbine to the pump impeller in order to eliminate slippage and, hence, energy loss when the vehicle is moving.

In conventional transmissions of this type, if four (4) forward speeds are desired, the gear box may be supplied with four pairs of meshing gears and four clutches for selectively engaging the appropriate gear pair. Accordingly, eight speed transmissions might require eight pairs of gears and eight clutches or two input clutches and four pairs of gears.

Transmissions of this type, depending on application, are provided in various configurations. In one configuration known as a "straight-through" configuration, the axis of the input shaft is coincident with an axis of the output shaft. In a "short drop" transmission, the axis of the output shaft is displaced vertically with respect to the axis of the input shaft. In a "long drop" transmission, the vertical distance between the output shaft and input shaft is even greater. In many, if not most instances, the construction and design of these three types of transmissions are substantially different even in situations where all three designs have substantially the same horse power rating. Each is individually designed to provide the necessary vertical distance between the input and the output. Manufacturers of these types of transmissions expend large amounts of dollars for transmission tooling unique to each type of transmission.

DISCLOSURE OF INVENTION

The present invention provides a new and improved transmission of the type used in heavy-duty, off-highway and on/off road applications. The invention is especially suited for "power shift" transmissions. It should be understood, however, that principles of this invention can be applied to other types of transmissions and should not be limited to a "power shift" type transmission.

According to a preferred embodiment of the invention, a multi-speed transmission is disclosed that includes a torque converter having a pump portion adapted to be coupled to a prime mover, such as a vehicle engine and a turbine portion arranged to be fluidly driven by the pump portion. The principle by which drive torque is transmitted between the converter pump and the converter turbine is conventional and does not form part of the present invention.

The transmission includes a gear box portion having at least two inputs and at least one output and further includes shiftable elements, such as clutch actuated gears which rotatably couple the inputs to the output in predetermined ratios depending on which gear clutches are actuated. A first drive mechanism rotatably couples the pump portion of the torque converter to one of the inputs to the gear box portion and establishes a first drive path from the pump portion to the output of the gear box. A second drive mechanism rotatably couples the turbine portion of the torque converter to the other of the inputs and establishes a second drive path from the turbine portion of the torque converter to the gear box output.

In a preferred embodiment of the invention, a first input module is disposed between the pump portion of the torque converter and the first input. In the preferred and illustrated embodiment, the first input module includes gears for directly coupling the pump portion of the torque converter to the first input; the gears chosen for the input module determine the overall ratio for the first drive path.

In the preferred embodiment, a second input module is also provided which includes gearing for rotatably coupling the turbine portion of the torque converter to the other input of the gear box. The gears chosen for the second input module determine the overall ratio for the second drive path.

In the exemplary embodiment, the first drive path comprises a direct drive path in that the pump portion of the torque converter, which is directly driven by the prime mover, is coupled to the output via the gear box portion. This drive path eliminates the slippage normally associated with a torque converter. The second drive path can be termed the torque converter drive path in that the output of the torque converter is coupled to the other input of the gear box. In the preferred and illustrated construction, the torque converter drive path includes forward and reverse clutches and determines whether the transmission is in forward, reverse or neutral.

According to the preferred embodiment of the invention, the first drive path includes a drive clutch for controlling the coupling between the pump portion of the torque converter and the first input.

The disclosed transmission construction can be used to provide a transmission having multiple speeds with a reduced number of gear/clutch assemblies. In a typical power shift-type transmission, four gear/clutch assemblies are required in order to provide four forward or four reverse speeds. With the disclosed invention, a gear box portion can be provided with four gear/clutch assemblies to provide six-eight speeds. This is accomplished by providing different overall gearing for the first and second drive paths. By using different gearing, four speeds can be obtained via the direct drive path and a different four speeds can be obtained by using the torque converter drive path.

The disclosed transmission construction can also provide a retarding function when desired. This is achieved by activating both drive paths so that the pump and turbine portions of the torque converter are driven at relative speeds with respect to each other. As is known, when a vehicle is coasting, the vehicle wheels drive the torque converter via the gear box. By activating both drive paths and providing gearing for the first and second drive paths that are different, the pump and turbine portions of the torque converter can be forced to rotate at different speeds and, in effect, become a energy absorber or retarder.

According to another feature of the invention, a multi-speed transmission is disclosed that includes an input shaft, an output shaft and at least two transmission shafts or countershafts. The axes of the countershafts and the axis of the output shaft are arranged such that the three axes are parallel with respect to each other. In addition, the axes are spaced radially from each other such that the axes are arranged in a triangular relationship. A first gear is rotatably connected to the first countershaft, a second gear is rotatably connected to the second countershaft, and the third gear is rotatably connected to the output shaft. The first, second, and third gears are sized and arranged to be in a co-meshing relationship. To provide a "straight through" type transmission, the axis of the output shaft is located to be coincident with the axis of the input shaft. To provide a "short drop" transmission, the axis of the output shaft is parallel, but spaced vertically from the axis of the input shaft. The long drop version of the transmission adds an extra shaft with drop gearing. With the disclosed arrangement, common shafts and gear/clutch assemblies can be used to provide the majority of all three versions of the transmission, the basic difference being the mounting locations for the shafts and the shape and size of the transmission housing. As a result, the cost of manufacturing multiple versions of the transmission should be substantially reduced.

Additional features of the invention will become apparent and a fuller understanding obtained by reading the following detailed description made in connection with the accompanying drawings.

BEST MODE FOR CARRYING OUT THE INVENTION

Figure 1:
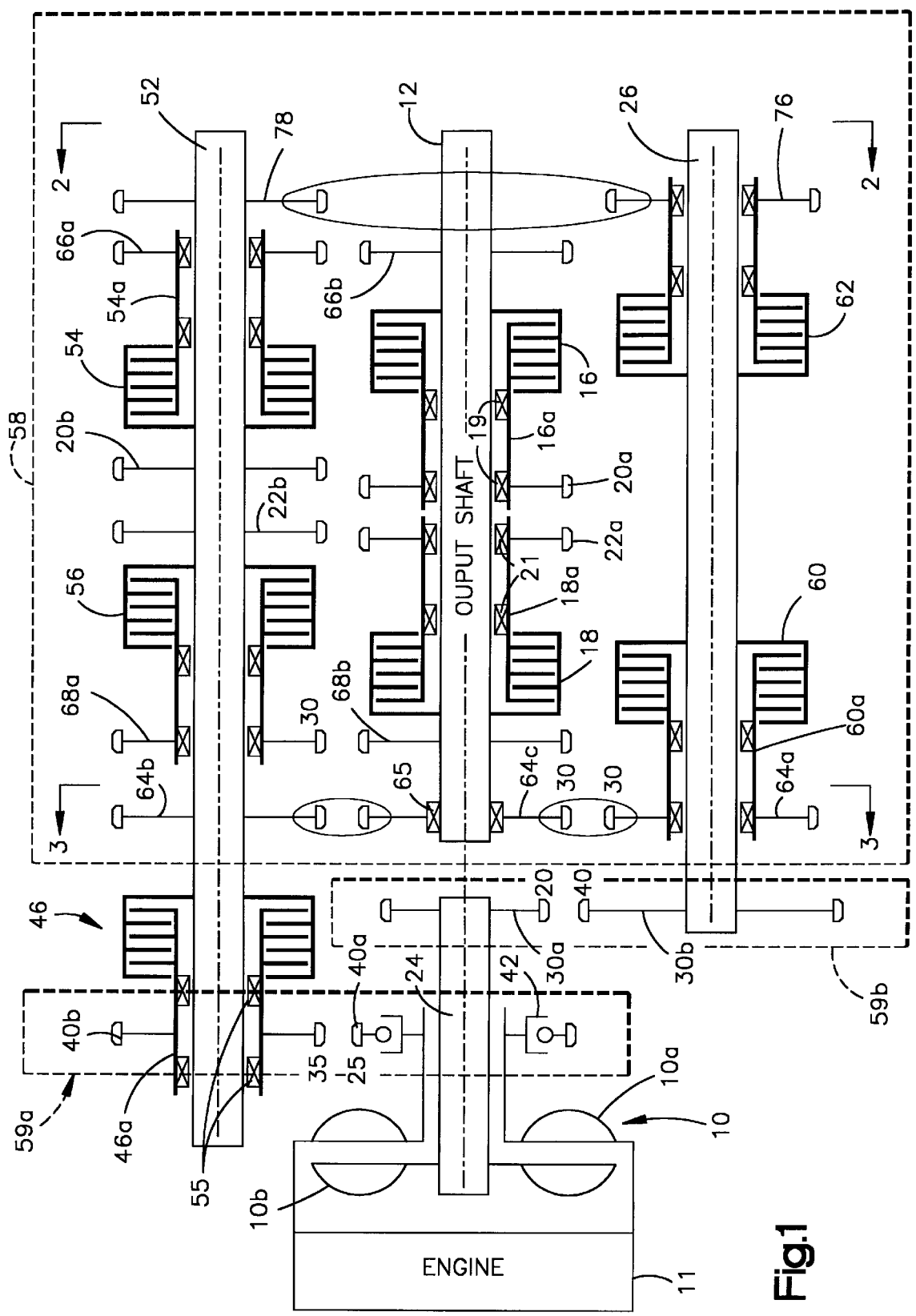
FIG. 1 is a schematic representation of a power shift transmission embodying the present invention.
Figure 2:
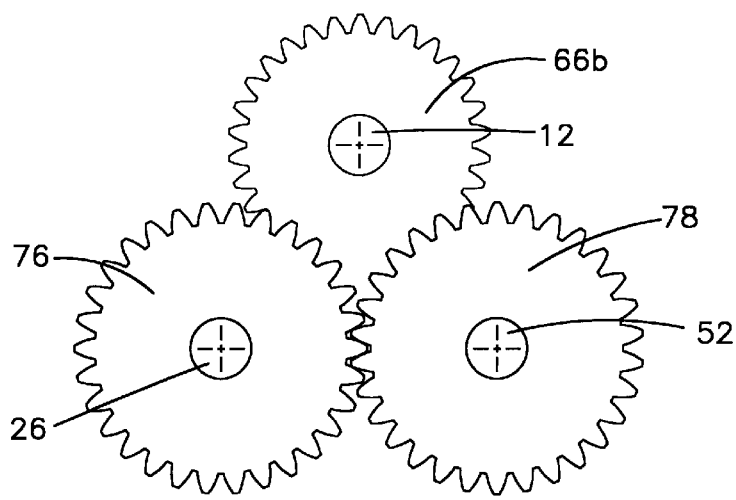
FIG. 2 is a fragmentary sectional view of the transmission as seen from the plane 2—2 in FIG. 1.

FIGS. 1 and 2 schematically illustrate a power shift-type transmission embodying features of the present invention. The type of transmission illustrated in FIGS. 1 and 2 has many applications including, but not limited to, backhoes, lift trucks, front end loaders, cranes, mining vehicles, skidders, boom trucks, pavers, on and off-highway dump and construction trucks, buses (transit and school), delivery trucks and other on and off-highway vehicles. As is conventional, the power shift transmission shown in FIGS. 1 and 2 includes a plurality of clutches which are selectively engaged and disengaged in order to couple and uncouple an associated gear to a rotating or rotatable shaft. The clutches which are preferably multi-disc wet clutches, may be conventional.

The disclosed transmission includes a torque converter 10 having a pump side 10a and a turbine side 10b. As is conventional, the pump side 10a is driven by an engine 11 or other prime mover. In the illustrated embodiment, the output of the transmission is delivered by a shaft labeled 12 which also mounts third and fourth speed clutches 16, 18 The clutches 16, 18 carry third and fourth speed gears 20a, 22a, on respective clutch hubs 16a, 18a. The hubs 16a, 18a are rotatably supported on the output shaft 12 by bearings 19, 21.

The transmission shown in FIGS. 1 and 2 includes both a "dual input" feature and a "triangulation" feature, both of which enhance the flexibility and application of the transmission.

DUAL INPUT FEATURE

In the disclosed transmission, two independent input drive paths are provided. The first input drive path includes the torque converter 10 and comprises the engine driven pump side 10a which, through hydraulic coupling, drives the turbine 10b forming part of the torque converter; the turbine 10b is attached to an input shaft 24. The input shaft 24 in turn is gear coupled to a forward/reverse shaft 26 by means of mating gears 30a, 30b.

A direct drive path, i.e., an input path which eliminates the torque converter 10 (and hence the losses associated with the torque converter) is provided by an input gear 40a which is coupled directly to the pump side 10a of the torque converter 10. Consequently, the gear 40a is directly driven by the engine 11. In the illustrated embodiment, a torsional damper 42 is disposed between the input gear 40a and a pump sleeve 44 which forms part of the pump impeller. The damper 42 reduces or eliminates the transmission of engine induced torsional vibrations to the rest of the drive train.

The direct input gear 40a is in meshing engagement with a driven gear 40b that is mounted to a clutch hub 46a forming part of a direct clutch 46. When the direct clutch 46 is actuated, the gear 40b is coupled to and rotates with a countershaft 52 which, in the illustrated embodiment, also carries the first and second speed clutches 54, 56. When the direct clutch 46 is disengaged, the gear 40b is free to rotate relative to the countershaft 52 and the clutch hub 46a includes roller bearings 55 to facilitate this relative rotation. As disclosed above, two independent drive paths between the engine and the transmission output are provided. The input ratio i.e. the ratio between engine revolutions and the respective input shafts (or counter shafts) 26, 52, may be the same for both drive paths or different. The ratio is determined by the gears selected for various locations in the transmission. In particular, the gear ratio between the gears 30a, 30b determines the input gear ratio for the torque converter path. The input gear ratio for the direct path is determined by the pump driven gear 40a and its companion gear 40b.

In the illustrated embodiment, the "direct" input ratio is 1.4, whereas the converter input ratio is 2.0. It should be apparent to those skilled in the art that these ratios can be easily adjusted by substitution of the gears 30a, 30b and 40a, 40b. When the ratio of the direct input and torque input are different, a transmission with four speed clutches can be operated as an eight speed transmission, i.e., by obtaining four speeds using the torque converter as an input and four different speeds using the direct input (for a total of eight speeds). The transmission illustrated in FIG. 1, may only have five different speeds if three speeds are duplicated in the direct and torque converter paths.

The ability to change the input gearing independent of the rest of the transmission is an important feature of the invention. To further facilitate this feature, the disclosed transmission can be made in a modular form.

In particular, and as best seen in FIG. 1, the overall transmission can be divided into a gear shifting module indicated by the dashed line 58 and direct and torque convertor input modules indicated by the dashed lines 59a, 59b, respectively. The shifting module 58 comprises the clutches and gears which provide the various forward and reverse speeds. The direct drive input module 59a includes the changeable gears 40a, 40b, which determine the direct drive ratio. The torque converter input module 59b, which includes the changeable gears 30a, 30b, determines the ratio of the torque converter drive path. With the disclosed construction, an entire family of transmissions can be generated by using a common shifting module 58 with various input modules 59a, 59b. Accordingly, transmissions for diverse applications can be provided by simply changing the relatively inexpensive input modules (or the gears 40a, 40b, 30a, 30b located within the modules), rather than the entire transmission assembly.

When the torque converter is used as an input, the transmission operates as follows. Rotation of the engine crankshaft is transmitted to the turbine side 10b of the torque converter 10 which rotates the input gear 30a. The forward/reverse countershaft 26 is rotated by virtue of the gear 30b which is meshed with the input gear 30a. The shaft 26 carries a forward clutch 60 and a reverse clutch 62. When the forward clutch 60 is engaged, an associated gear 64a carried by a hub 60a of the forward clutch 60, is coupled and is rotatable with the shaft 26. Rotation of the gear 64a is transmitted to a corresponding gear 64b of the first/second countershaft 52 by virtue of an idler gear 64c which is rotatably supported on the output shaft 12 by a bearing 65. It should be apparent that by transmitting torque through the idler gear 64c, the forward/reverse shaft 26 rotates in the same direction as the first/second shaft 52. If the gear 64c is the same size as gear 64a (as is illustrated), the shaft 52 rotates at the same speed as the shaft 26.

By then selectively engaging the first speed clutch 54, first gear 66a, carried by clutch hub 54a is coupled to the first/second drive shaft 52 and is rotated thereby. As seen in FIG. 1, the first gear 66a is in meshing engagement with a companion gear 66b fixed to the output shaft 12. Hence, engagement of the clutch 54 couples rotation of the engine to the output shaft 12 by means of the gears 30a, 30b, 64a, 64b, 64c, 66a and 66b. Similarly, the output shaft 12 is driven at a second speed by actuating the second speed clutch 56, thereby coupling an associated gear 68a to the first/second shaft 52. When the second speed clutch is engaged, the output shaft is driven by the engine through gears 30a, 30b, 64a, 64b, 64c, 68a and 68b.

When the third speed clutch 16 is engaged, rotation of the engine is coupled to the output shaft 12 by gears 30a, 30b, 20b (which is fixed to the shaft 52), and 20a (which is carried by a hub 16a forming part of the third speed clutch 16). A fourth speed is achieved using the fourth speed clutch 18 which couples the associated fourth speed gear 22a to the output shaft 12 and which in turn is driven by an associated gear 22b fixed to the first/second speed shaft 52. Again, rotation of the engine is transmitted to the first/second speed shaft by the gears 30a, 30b, 64a, 64b, 64c.

When in the direct mode, the direct clutch 46 couples the gear 40b to the first/second speed shaft 52. Rotation of the engine is coupled to the output shaft 12, when in the direct mode, by the direct input gear 40a, the direct clutch gear 40b and the gears associated with the first, second, third or fourth clutches, depending on which one is selected. It should be noted that when in the direct mode, the same clutch gears and countergears are used in the basic common parts box, to couple rotation of the engine to the output shaft 12 as in the torque converter mode.

Reverse in the illustrated transmission configuration, is only available via the torque converter path. The forward/reverse shaft 26 carries the reverse clutch 62 which is selectively energized to couple a reverse gear 76 to the forward/reverse shaft 26. The reverse gear 76 is in meshing engagement with a companion gear 78 fixed to the first/second shaft 52. In an actual transmission, as will be explained later, the forward/reverse shaft 26 and first/second shaft 52 are actually located in an adjacent relationship so that the gears 76, 78 can be in meshing engagement at all times. It should be apparent that when the reverse clutch 62 is actuated, the first/second countershaft 52 is caused to rotate in a direction opposite that of the forward/reverse shaft 26. As a result, the output shaft 12 will be rotated in a direction that is opposite the rotation that occurs when the forward clutch is engaged. When the reverse clutch 62 is engaged, selectively engaging the first, second, third or fourth clutches will provide four different reverse speeds.

THE "TRIANGULATION" FEATURE

Figure 3:
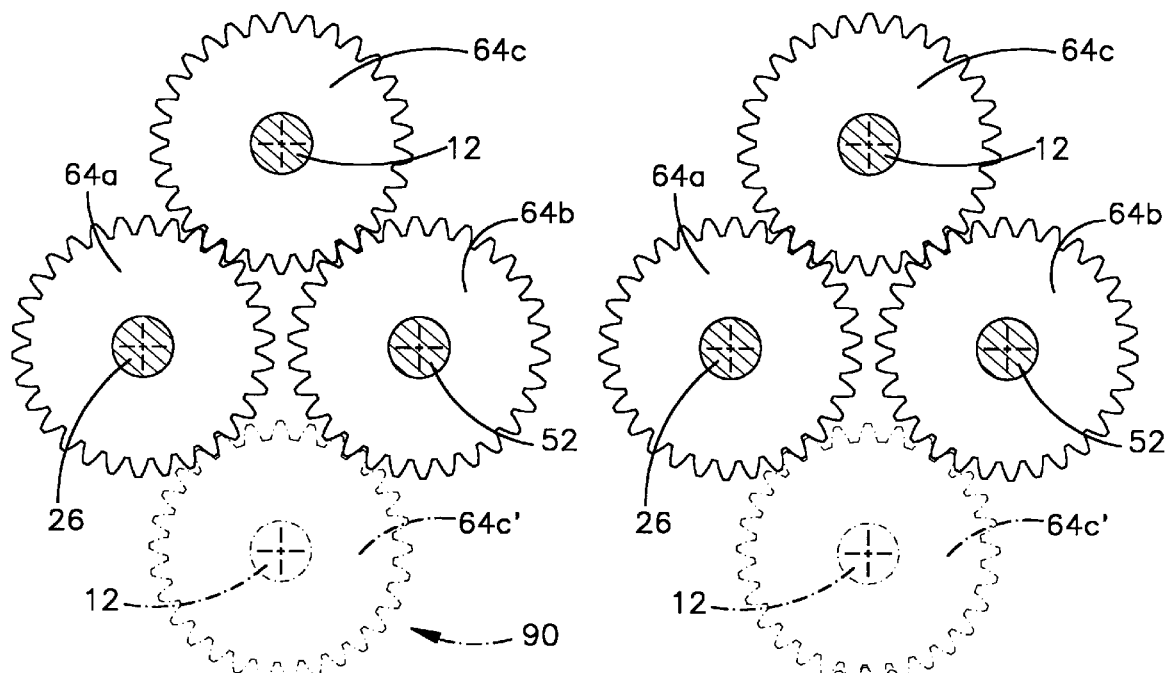
FIG. 3 is a fragmentary sectional view with additional parts shown schematically, as seen from the plane indicated by the line 3—3 in FIG. 1.
Figure 4:
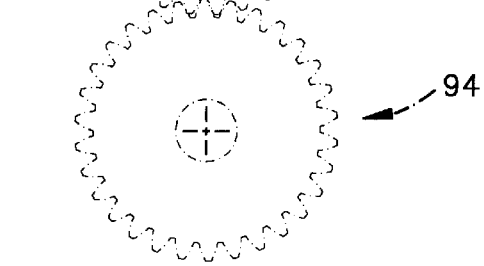
FIG. 4 is a fragmentary sectional view with additional parts shown schematically, as seen from the plane indicated by the line 3—3 in FIG. 1.

According to a preferred embodiment of the invention, the axes of the input shaft 24, the first/second countershaft 52 and forward/reverse shaft 26 are arranged in a triangular pattern. This is best seen in FIGS. 2 and 3. In the preferred and illustrated embodiment, the three axes are located at the apices of an equilateral triangle. By arranging the axis in this way, the reverse gear 76 on the forward/reverse shaft 26 and the companion gear 78 which is fixed to the first/second shaft 52 can be constantly meshed. In this configuration, the direct input gears 40a, 40b and the torque converter input gears 30a, 30b can also be in constant mesh. As explained above, the output shaft 12 carries the idler gear 64c which must be in constant mesh with both the forward/reverse shaft 26 and the first-second shaft 52. When the output shaft 12 is positioned as shown in FIGS. 1 and 2, the axis of the output shaft 12 is aligned and is coincident with the axis of the input shaft 24. It should be apparent from FIG. 3, that the idler gear 64c on the output shaft 12 is in concurrent meshing engagement with the companion gear 64b on the first/second shaft 52 and the companion gear 64a on the forward/reverse shaft 26. This transmission configuration is often termed a "straight through" configuration and is a configuration used on many on/off-highway vehicles.

However, other types of off-highway vehicles require a "short drop" or a "long drop" configuration in which the axis of the output shaft 12 is located a vertical distance below the input shaft 24. The location of the output shaft in a short drop transmission is illustrated in phantom in FIG. 3 and is designated by the reference character 90. With the disclosed transmission, this can be easily achieved without redesigning or substantially modifying the transmission shown in FIG. 1. To achieve a short drop configuration, the output shaft 12 is positioned below and laterally centered with respect to the forward/reverse shaft 26 and first/second shaft 52. Due to the triangular arrangement of the input, forward/reverse and one-two shafts 24, 26, 52, the required gear meshes between the reverse gear pairs 76, 78 and gears 64a, 64b, 64c can be easily made. To provide "short drop" transmission, only the housing needs to be modified to provide the mounting points for the output shaft 12.

To achieve a "long drop" transmission, an additional shaft with at least one gear is mounted below the "output shaft" located at the "short drop" position. The position of the additional shaft which provides the actual output for the transmission is shown in phantom in FIG. 3 and is indicated by the reference character 94.

With the disclosed invention, an entire family of transmissions can be created with a multitude of speeds in various configurations and using a commonality of components or without requiring specialized components (other than transmission housings).

VEHICLE RETARDING SYSTEM

The disclosed transmission can also be operated to provide a retarding effect when a vehicle is coasting, i.e. traveling downhill with the accelerator off. When a vehicle is coasting and is in the direct driving mode, the vehicle wheels are mechanically connected to and therefore, drive the engine. The resistance to rotation provided by the engine compression acts as a brake or retarder tending to reduce or retard the speed of the vehicle. With the disclosed transmission an additional retarding effect may be obtained by simultaneously engaging both the direct drive clutch 46 and the forward clutch 60 (or the reverse clutch 62). For this mode of operation, the drive ratio for the direct drive input 59a and the torque converter input 59b, must be different. With the forward clutch 60 engaged, the drive train is coupled to and rotates a turbine 10b. If the direct drive and torque converter paths have a different ratio, the turbine 10b will be forced to rotate at a speed greater than or less than (depending on the ratio) of the impeller boa, which is connected to the engine and is driven thereby. This relative speed between turbine and impeller causes the torque converter to act as a retarder, or what is sometimes referred to as an energy absorber.

It is believed that, by using a gear ratio (determined by the input modules 59a, 59b), which causes the turbine to rotate at a speed 40%–50% greater than the impeller speed, varying levels of horse power absorption by the converter can be expected. The energy absorption is a function of the difference in turbine and impeller speeds and vane configuration (as determined by the ratio of the gears 40a, 40b and 30a, 30b, forming part of the input modules 59a, 59b, respectively). Differing levels of absorption may be obtained by bringing on the reverse turbine clutch instead of the forward turbine clutch.

This forces the turbine to rotate in the opposite direction creating a different absorbing characteristic in the torque converter.

The incorporation of the retarding feature into the transmission may be achieved by a modification to the controls that actuate and deactivate the various clutches of the transmission. In most instances, controls for these types of transmission are provided by computer based controllers that are programmable. In order to provide the retarding effect, existing software can be modified to effect simultaneous actuation of both the direct drive clutch 46 and the forward clutch 60 (or reverse clutch 62) under appropriate conditions, i.e., when the vehicle is coasting. Alternately, an operator actuated control can be provided which would signal the computer based control system to engage both clutches to provide the retarding effect, provided that operating conditions of the vehicle permit this mode change.

As is known, the "absorption" of energy by a torque converter is released as heat. The present invention does contemplate providing cooling of the torque converter fluid in order to remove the heat during the retarding mode. This additional cooling may be provided using several alternatives. One alternative includes a control valve that is triggered whenever the "retarding mode" is activated which directs fluid from the converter to a high capacity heat exchanger.

A second alternative involves proper sizing of the engine radiator. In applications for which this transmission is intended, the torque converter fluid is usually conveyed through an exchanger that forms part of the engine radiator and is cooled thereby. In most vehicles the engine radiator and the torque converter coolant exchanger (which forms part of the radiator) must be sized so that there is sufficient cooling capacity to cool converter fluid when the converter is being operated in a stalled condition for an extended period of time.

This cooling capacity for the converter fluid must be available even when the engine is fully loaded and thus requires significant cooling capacity from the radiator itself. As a consequence, standard vehicle radiators have significant capacity for cooling both engine coolant torque converter fluid.

In those applications where significant cooling capacity is provided within the vehicle radiator itself, additional heat exchangers may not be necessary. This is due to the fact that when the vehicle is placed in a "retarding mode", it is typically traveling downhill at closed throttle. While the engine may be turning at high speed due to the direct connection to ground it is not being fueled by the engine control. Consequently, with the engine "coasting", very little cooling capacity is needed by the engine and very little load is placed on the engine coolant section of the radiator. This, in effect, provides added cooling capacity to the heat exchanger portion of the vehicle radiator used to cool the torque converter fluid. Thus, by taking advantage of the added capacity available when the vehicle is coasting, separate or additional heat exchangers may not be necessary for the torque converter fluid when the transmission is operated in a "retarding" mode.

It should be apparent that an extremely flexible transmission construction is provided by the present invention. Transmissions intended for diverse applications can be easily created using many common components. In addition, a wide variety of transmission "drops" can be provided using many common components and a retarding mode can be easily implemented.

Although the invention has been described with a certain degree of particularity, it should be understood that various changes can be made to it without departing from the spirit or the scope of the invention as hereinafter claimed.

What is claimed is:

1. A multi-speed transmission assembly, comprising:
  a) an input shaft for receiving rotational forces from a prime mover;
  b) first and second countershafts including gear assemblies having clutches for coupling gears to said countershafts;
  c) the axes of said first and second countershafts and an axis of an output shaft being arranged such that the three axes are parallel with respect to each other and are spaced radially from each other, such that the axes are arranged in a triangular relationship;
  d) a first gear carried by said first countershaft, and a second gear carried by said second countershaft, said first and second gears being in co-meshing relationship and operative, under predetermined operating conditions, to produce rotation in said first countershaft that is opposite that produced in said second countershaft;

e) a first companion gear carried by said first countershaft and a second companion gear carried by said second countershaft, said companion gears being spaced with respect to each other so that said companion gears are not in direct meshing engagement;

f) a third gear carried by said output shaft, said third gear being in co-meshing engagement with said first and second companion gears;

g) a first clutch operative to selectively couple one of said first and second gears to its associated countershaft; and, h) a second clutch operative to selectively couple one of said first companion and second companion gears to its associated countershaft.

2. The apparatus of claim 1, wherein said input shaft is rotatable about an axis that is coincident with the axis of said output shaft.

3. The apparatus of claim 1, wherein the axis of said output shaft is parallel but spaced from the axis of said input shaft.

4. The multi-speed transmission assembly of claim 1 where the axes of said first, second and third gears define the apices of an equilateral triangle.

5. A multi-speed transmission, comprising:

a) a torque converter having a pump portion adapted to be coupled to a prime mover and a turbine portion arranged to be fluidly driven by said pump portion;

b) a gear box having first and second inputs and an output and including shiftable elements for rotatably coupling said inputs to said output in predetermined ratios;

c) first drive means for rotatably coupling said pump portion of said torque converter to only said first input to establish a first drive path from said pump portion to said output of said gear box, under a first predetermined operating condition, said first drive means including a first input module including gears for coupling said pump portion of said torque converter with said first input, said gears establishing the overall gear ratio for said first drive path;

d) second drive means for rotatably coupling said turbine portion of said torque converter to only said second input to establish a second drive path from said turbine portion to said output, under a second predetermined operating condition, said second drive means including a second input module for coupling said turbine portion of said torque converter with said second input and including gears for establishing an overall gear ratio for said second drive path;

e) said ratio established by said second input module being different from that established by said first input module;

f) such that under said first predetermined operating condition, said pump portion of said torque converter is coupled to said first input while said turbine portion of said torque converter is not coupled to said second input by said second drive means; and, g) such that under said second predetermined operating condition, said pump portion of said torque conversation is not coupled to said first input by said first drive means while said turbine portion of said torque converter is coupled to said second input by said second drive means; and, h) means for concurrently actuating said first drive means and said second drive means under a third predetermined operating condition such that said pump portion and said turbine portion of said torque converter are urged to rotate at a relative speed with respect to each other by driving forces applied to said output such that said torque converter acts as an energy absorber.

6. A method of operating a multi-speed transmission assembly, comprising:

a) providing a gear box having two inputs and one output and clutch actuated gear assemblies for establishing predetermined gear ratios between said inputs and said output;

b) providing a first means for connecting one of said gear box inputs to a pump portion of a torque converter said connection including a first gear train;

c) providing a second means for connecting said other gear box input to a turbine portion of said torque converter, said connection including a second gear train; and, d) concurrently operating said first and second means in order to concurrently connect said first and second inputs to said pump portion and turbine portion, respectively, under predetermined operating conditions in order to produce energy absorption in said torque converter.

7. The method of claim 6, further comprising the step of using said first and second gear trains to establish an overall drive ratio for said first and second inputs, respectively.

8. The method of claim 6, further comprising the steps of:

a) providing first and second countershafts and an output shaft; and, b) arranging the axes of said first and second countershafts and said output shaft to be parallel, but radially spaced from each other such that the axes are arranged in a triangular relationship.

9. The method of claim 8 wherein said triangular relationship defines an equilateral triangle.

10. The method of claim 6, further comprising the step of concurrently coupling said first input to said output via said first gear train and connecting said second input to said output via said second gear train in order to produce energy absorption in said torque converter.

11. A multi-speed transmission, comprising:

a) a torque converter having a pump portion adapted to be coupled to a prime mover and a turbine portion arranged to be fluidly driven by said pump portion;

b) a gear box having two inputs and an output and including shiftable elements for rotatably coupling said inputs to said output in predetermined ratios;

c) first drive means for rotatably coupling said pump portion of said torque converter to one of said inputs to establish a first drive path from said pump portion to said output of said gear box;

d) second drive means for rotatably coupling said turbine portion of said torque converter to the other of said inputs to establish a second drive path from said turbine portion to said output.

e) a first input module including gears for coupling said pump portion of said torque converter with said one input, said gears establishing the overall gear ratio for said first drive path;

f) a second input module for coupling said turbine portion of said torque converter with said other input and including gears for establishing an overall gear ratio for said second drive path, said ratio established by said second input module being different from that established by said first input module; and, g) means for concurrently actuating said first drive means and said second drive means under predetermined operating conditions such that said pump portion and said turbine portion of said torque converter are urged to rotate at a relative speed with respect to each other by driving forces applied to said output such that said torque converter acts as an energy absorber.

12. A multi-speed transmission assembly, comprising:

a) an input shaft for receiving rotational forces from a prime mover;

b) first and second countershafts including gear assemblies having clutches for coupling gears to said countershafts;

c) the axes of said first and second countershafts and an axis of an output shaft being arranged such that the three axes are parallel with respect to each other and are spaced radially from each other, such that the axes are arranged in a triangular relationship; and d) a first gear carried by said first countershaft, and a second gear carried by said second countershaft, said first and second gears being in co-meshing relationship and operative, under predetermined operating conditions, to produce rotation in said first countershaft that is opposite that produced in said second countershaft e) a first companion gear carried by said first countershaft and a second companion gear carried by said second countershaft, said companion gears being spaced with respect to each other so that said companion gears are not in direct meshing engagement;

f) a third gear carried by said output shaft, said third gear being in co-meshing engagement with said first and second companion gears;

g) clutch means operable to selectively couple one of said first or second gears to its associated countershaft and further operable to selectively couple one of said first companion or second companion gears to its associated countershaft.

* * * * *